B. P. TAYLOR.
CUSHION TIRE.
APPLICATION FILED MAY 21, 1917.
1,289,018.
Patented Dec. 24, 1918.
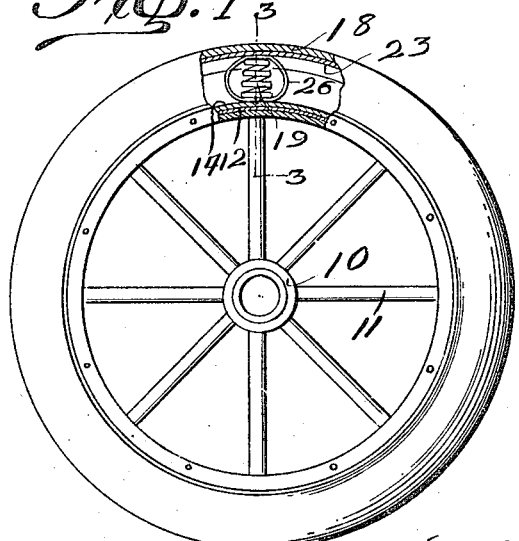
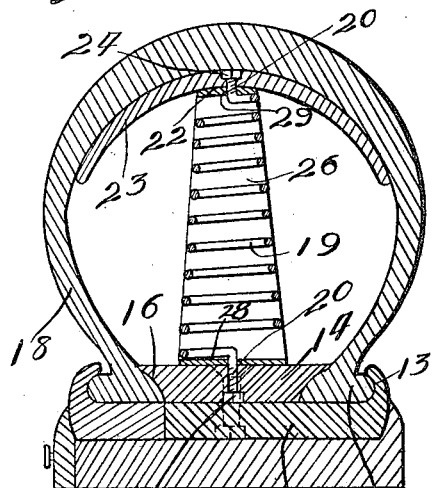
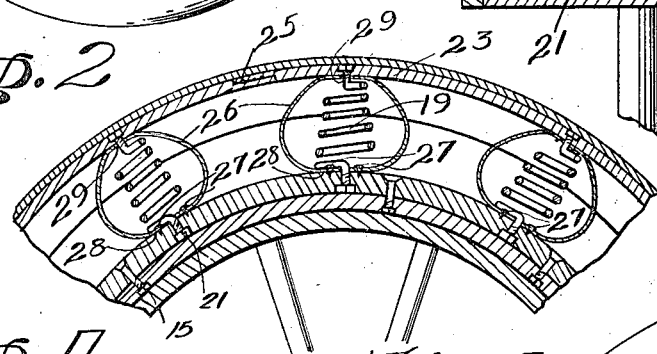
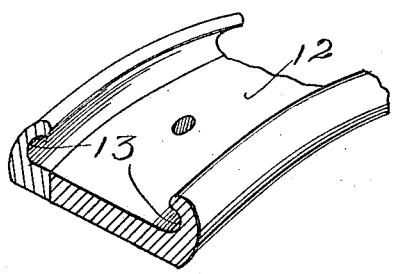
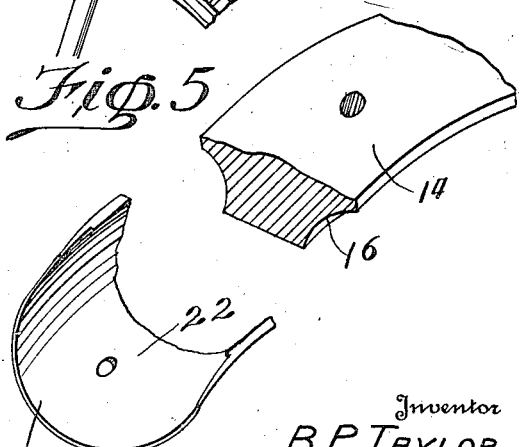
Inventor
B. P. TAYLOR
Witnesses
By
Attorneys

UNITED STATES PATENT OFFICE.

BLISS P. TAYLOR, OF MUNCIE, INDIANA, ASSIGNOR OF ONE-HALF TO WILFRED R. STRATTON, OF REDKEY, INDIANA.

CUSHION-TIRE.

1,289,018. Specification of Letters Patent. Patented Dec. 24, 1918.

Application filed May 21, 1917. Serial No. 169,944.

*To all whom it may concern:*

Be it known that I, BLISS P. TAYLOR, a citizen of the United States, residing at Muncie, in the county of Delaware, State of Indiana, have invented certain new and useful Improvements in Cushion-Tires; and I do hereby declare the following to be a full, clear, and exact description of the invention, such as will enable others skilled in the art to which it appertains to make and use the same.

This invention is an improvement in vehicle wheels and has particular reference to a cushion tire therefor.

An object of the invention is to provide a novel construction and arrangement of spring devices within a tire casing whereby the tire will embody all of the characteristics of a pnuematic tire and not be subject to the objectional features thereof.

Another object is to provide a tire of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a side elevation of a vehicle wheel showing the tire applied thereto and partly broken away and shown in section.

Fig. 2 is an enlarged fragmentary longitudinal section of the tire.

Fig. 3 is a transverse section on the line 3—3 of Fig. 1.

Fig. 4 is a fragmentary perspective view of the sectional rim of the tire.

Fig. 5 is a similar view of a ring member associated with said rim.

Fig. 6 is a similar view of a reinforcing shoe employed in connection with the invention.

Referring more particularly to the drawing the numeral 10 indicates generally a vehicle wheel having the usual spokes 11 upon which is mounted in any preferred manner the sectional rim 12 of the tire which is provided in its outer surface with annular grooves 13 and which has coöperating therewith a ring member 14 detachably secured to the section 12 by means of bolts 15 and having upon each edge thereof an annular groove 16 which coöperates with the adjacent groove 13 to form a recess for receiving the shoe portions 17 of the flexible tire casing 18 which may be made of any suitable material.

A plurality of spring devices are mounted within the casing and each device preferably comprises a coil spring 19 of conical formation having its extremities screw threaded as indicated at 20, the inner extremity extending through the ring member 14 and secured in position by means of a nut 21 countersunk in the inner surface of said ring member. The other extremity 20 of each spring 19 is extended through an opening 22 in an annular reinforcing shoe member 23, preferably of semi-circular formation in cross section and engaging the tread portions of the tire casing 18. The last named extremity of the spring 19 is secured to the shoe member 23 by means of a nut 24. The shoe member 23 is preferably split and has its ends reduced as indicated at 25 and arranged in overlapping relation to present a flush surface.

Preferably associated with each coil spring 19 is a leaf spring 26 which extends longitudinally of the tire casing and has its ends secured at 27 to the outer surfaces of the ring member 14. The portions of the spring 26 where the same is secured to the member 14 are preferably flattened as indicated at 28 and bowed to a greater degree adjacent said flattened portions than at the intermediate portion thereof which extends on the interior side of the shoes 23 and which is provided with an opening 29 registering with the opening 22 in said shoe 23 and through which extends the outer threaded extremity 20 of the coil spring 19.

What is claimed is:—

In a vehicle wheel including a tire casing, a rim, a ring member coöperating therewith to retain the tire casing in position, a shoe member within the tire casing and engaging the tread portion thereof, cushion devices each including a coil spring having its ends mounted in said ring member and shoe member, and a leaf spring encircling said coil